(12) United States Patent
Ngo et al.

(10) Patent No.: US 7,134,132 B1
(45) Date of Patent: *Nov. 7, 2006

(54) SYSTEM AND METHOD FOR DISPLAYING ADVERTISEMENTS

(75) Inventors: J. Thomas Ngo, Palo Alto, CA (US); Malcolm Slaney, Palo Alto, CA (US)

(73) Assignee: Interval Research Corporation, Seattle, WA (US)

( * ) Notice: Subject to any disclaimer, the term of this patent is extended or adjusted under 35 U.S.C. 154(b) by 417 days.

This patent is subject to a terminal disclaimer.

(21) Appl. No.: 10/417,798

(22) Filed: Apr. 17, 2003

Related U.S. Application Data

(63) Continuation of application No. 09/514,056, filed on Feb. 25, 2000, now Pat. No. 6,574,793.

(51) Int. Cl.
*H04N 7/10* (2006.01)
*H04N 7/025* (2006.01)

(52) U.S. Cl. .................. 725/34; 725/32; 725/34; 725/42; 725/46

(58) Field of Classification Search ............ 725/34, 725/35, 41, 42, 46, 32, 36, 60–61; 345/619, 345/646, 682
See application file for complete search history.

(56) References Cited

U.S. PATENT DOCUMENTS

| | | | |
|---|---|---|---|
| 4,841,291 A | 6/1989 | Swix et al. ................. | 340/725 |
| 5,422,986 A | 6/1995 | Neely ......................... | 395/126 |
| 5,724,521 A | 3/1998 | Dedrick ...................... | 395/226 |
| 5,767,857 A | 6/1998 | Neely ......................... | 345/427 |
| 5,828,839 A | 10/1998 | Moncreiff ............. | 395/200.34 |
| 5,892,691 A | 4/1999 | Fowler ....................... | 364/578 |
| 5,903,816 A | 5/1999 | Broadwin et al. ........... | 455/3.1 |
| 5,915,243 A | 6/1999 | Smolen ....................... | 705/14 |
| 5,933,150 A | 8/1999 | Ngo et al. .................. | 345/473 |
| 5,959,623 A | 9/1999 | Van Hoff et al. ........... | 345/333 |
| 5,974,398 A | 10/1999 | Hanson et al. .............. | 705/14 |
| 5,990,927 A | 11/1999 | Hendricks et al. .......... | 348/6 |
| 6,160,570 A | 12/2000 | Sitnik ........................ | 348/1 |
| 6,169,542 B1 | 1/2001 | Hooks et al. ............... | 345/327 |
| 6,177,931 B1 | 1/2001 | Alexander et al. ......... | 345/327 |
| 6,282,713 B1 | 8/2001 | Kitsukawa et al. ......... | 725/36 |
| 6,906,732 B1 * | 6/2005 | Li et al. ..................... | 345/646 |

OTHER PUBLICATIONS http://www.doubleclick.com.
http://www.wink.com.
Bregler et al., "Video Rewrite: Driving Visual Speech with Audio", ACM SIGGRAPH 97.
B. Moghaddam et al., "Probalistic Visual Learning for Object Representation," IEEE Transactions of Pattern Analysis and Machine Intelligence, vol. 19, No. 7, Jul. 1997.
Darrrell, et al, "A Virtual Mirror Interface Using Real-Time Robust Face Tracking," Proceedings of the Third Intl. Conf. on Face and Gesture Recognition, IEEE Computer Society Press, Apr. 1978, Nara Japan.

* cited by examiner

*Primary Examiner*—Ngoc Vu
(74) *Attorney, Agent, or Firm*—Van Pelt, Yi & James

(57) ABSTRACT

A method and system for displaying advertisements. The advertisements are displayed on a television having a controlled connected thereto and configured for receiving commands from a viewer of the television. The method includes displaying a first advertisement on the television, receiving a command from the viewer of the television to display a second advertisement, the second advertisement being a variant of the first advertisement, and displaying the second advertisement on the television.

12 Claims, 6 Drawing Sheets

Channel 2

Channel 3

Channel 4

SYSTEM AND METHOD FOR DISPLAYING ADVERTISEMENTS

This application is a continuation of application Ser. No. 09/514,056, filed Feb. 25, 2000, now U.S. Pat. No. 6,574,793.

BACKGROUND OF THE INVENTION

The present invention relates generally to interactive television, and more particularly, to a system and method for displaying a sequence of advertisements or other informational images to a viewer, where the viewer selects information sets of interest to the viewer or the information displayed is based on viewer preferences.

The distribution of advertisement via television is well established. Advertisers typically purchase advertisement time on a specific channel and time period with the rate being set by the popularity of programs airing within the time period. The more popular the underlying program or time slot, the more expensive the advertising rate. With the increase in the number of network stations, advertisers are confronted with the task of determining which stations are appropriate for their products or services. It is also difficult for advertisers to select a type of advertisement that will appeal to a broad cross section of the population (e.g., males, females, young and old).

Commercials are often targeted based on the type of television shows a viewer watches. For example, an advertisement for tulips is preferably displayed to a viewer who watches gardening programs. Similarly, an advertiser on the Internet may track the web sites that a user visits and use this information to determine that the user is interested in gardening. A banner ad for tulips may then be displayed to the user. Internet advertisement companies often use a targeting technology that allows advertisers to target consumers through the use of profiling criteria developed based on users activity on the Internet. The decision as to which advertisement to display is made remotely (e.g., cable headend system or server). This requires that information about a user be transferred to a remote collection area, which can create privacy problems. A user may not want personal information collected on his television viewing or "surfing" habits and provided to advertisers or other service providers.

Furthermore, from a consumer's perspective, one of the most irritating aspects relating to advertising is the inability of the consumer to provide any control over the content of the advertisement information. The viewer can only watch what is presented and cannot switch between different advertisements as he can with programs.

There is, therefore, a need for a method and system for displaying advertisement on a television that allows a viewer to interact with the advertisement by providing the viewer a controllable advertising window for display of advertising information or other selectable information, and may also allow a profile to be established on the viewer so that the advertisement presented to the user is in a form that interests the viewer. There is also a need for a system and method for displaying targeted advertisements to a user without collecting information about a user at a location remote from the user.

SUMMARY OF THE INVENTION

A method and system for displaying advertisements on a television are disclosed. The television has a controller connected thereto and configured for receiving commands from a viewer of the television.

In one aspect of the invention, a method generally includes displaying a first advertisement on the television and receiving a command from the viewer of the television to display a second advertisement. The second advertisement is a variant of the first advertisement. The method further includes displaying the second advertisement on the television.

In another aspect of the invention, a method generally includes receiving an analog signal comprising a plurality of channels and selecting one of the plurality of channels. The analog channels are converted to a digital signal and a data stream from the digital signal is selected to display a first advertisement. The method further includes receiving a command from the viewer of the television to display a second advertisement, different from the first advertisement. A data stream is selected from the digital signal to display the second advertisement.

In yet another aspect of the invention, a system generally comprises a controller configured for connection to the television and operable to receive commands from a viewer of the television to switch from a first displayed advertisement to a second advertisement. The controller includes a processor operable to combine a video stream of the first advertisement with graphics from a digital data stream to create the second advertisement.

Another method of the invention is for displaying advertisements on a television having a controller configured for storing information about at least one viewer of the television. The method includes receiving a plurality of advertisements at the controller, selecting an advertisement based on the information about the viewer and displaying the selected advertisement.

In another aspect of the invention the controller includes a memory device operable to store information about at least one viewer of the television, a receiver configured for receiving multiple advertisements scheduled for display on the television at a specified time, and a processor operable to select one of said multiple advertisements based on said information about the viewer.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For the purpose of clarity, details relating to technical material that is known in the technical fields related to the invention have not been described in detail.

Figure 1:
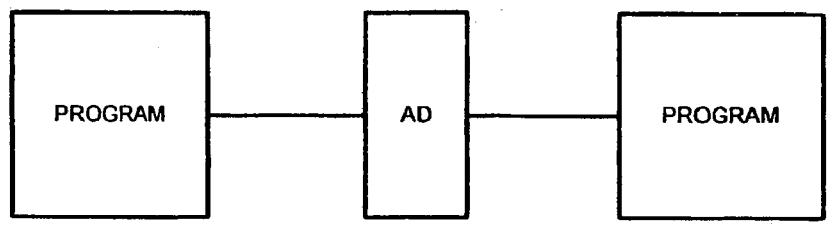
FIG. 1 is a block diagram illustrating conventional television advertisements inserted between program material.
Figure 1:
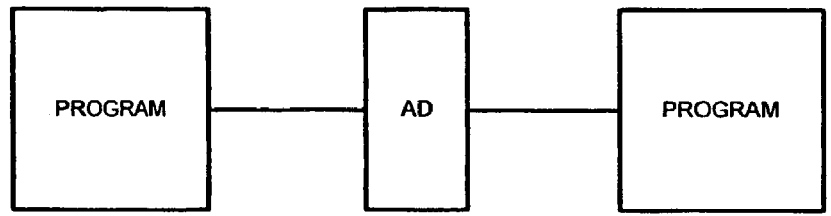
Figure 1:
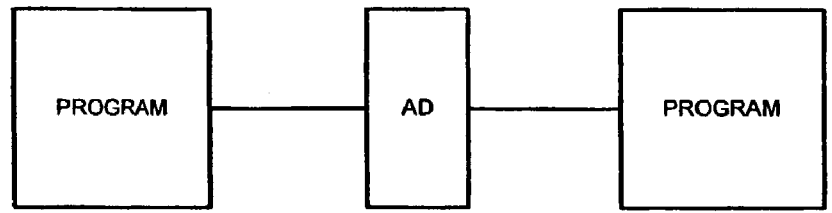
Figure 2:
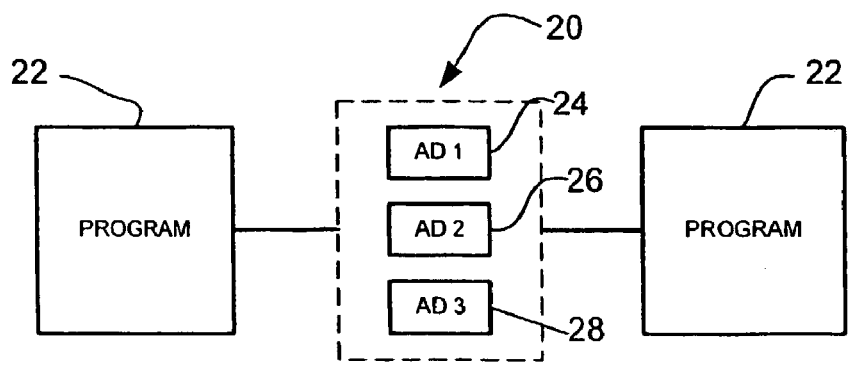
FIG. 2 is a block diagram illustrating multiple advertisements that a viewer can switch between, inserted between program material.

Referring now to the drawings, and first to FIG. 2, a system of one embodiment of the invention is schematically shown and generally indicated at 20. The system 20 provides two or more advertisements for viewing on a television during a break in television programming 22. Instead of providing a single advertisement as shown in FIG. 1, which may or may not be of interest to the viewer, the system shown in FIG. 2 provides three different advertisements (or three variants of one advertisement) 24, 26, 28 which the viewer may switch between. For example, the first advertisement 24 may be for a food product directed to young males, the second advertisement 26 may be for the same food product but directed to young females, and the third advertisement 28 may also be for the same food product but directed to parents. In another example, the variants may be different colors or types of cars. The system thus allows viewers to switch ("surf") between different advertisements to find the one that is best suited for the viewer.

Figure 3:
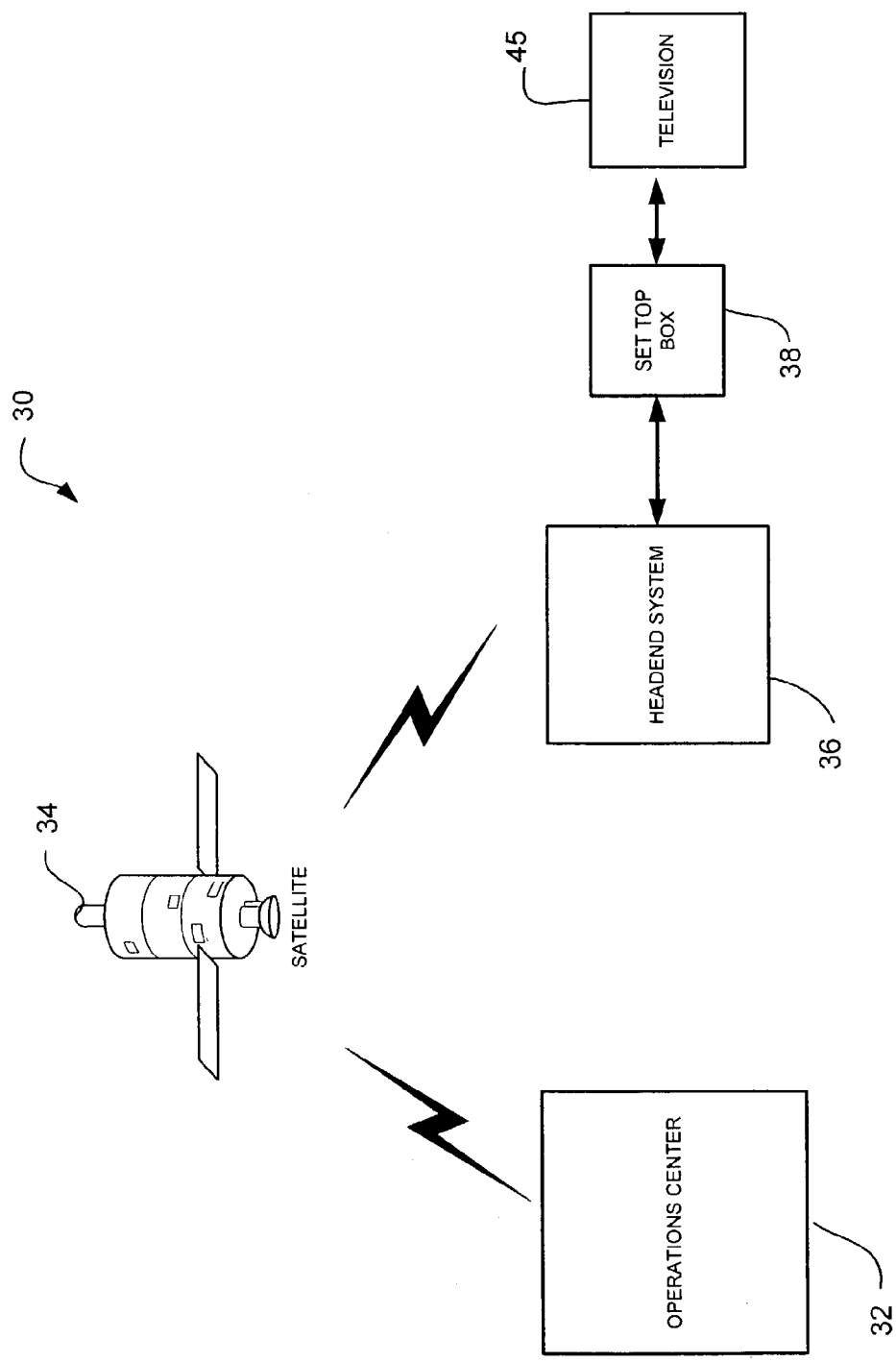
FIG. 3 is a diagram of a television delivery system that may be used to delivery the advertisements shown in FIG. 2.

The advertisements are preferably displayed on a television connected to a network system such as cable network system 30 shown in FIG. 3. In one embodiment, the system 30 includes an operations center 32 where control information is assembled in the form of digital data, a digital compression system where the digital data is compressed, combined, multiplexed, encoded, and mapped into digital signals for satellite 34 transmission to a headend system 36 and a plurality of in home set top boxes 38, or other suitable receivers, operable to decompress the digital data and display the advertisement for a viewer. The decompressed video signals may be converted into analog signals such as NTSC (National Television Standards Committee) format signals for television display. The signal is typically compressed prior to transmission and may be transmitted through broadcast channels such as cable television lines or direct satellite transmission systems. Telephone lines, cellular networks, and fiber optics may also be used in place of the cable system. Control signals sent to the set top box 38 are also decompressed and either executed immediately or placed in local storage such as RAM. The set top box 38 may then be used to overlay or combine different signals to form the desired display on the viewer's television.

It is to be understood that the system 30 described above and shown herein is only one example of a system used to convey signals to the television 45. The television network system may be different than described herein without departing from the scope of the invention.

Figure 4:
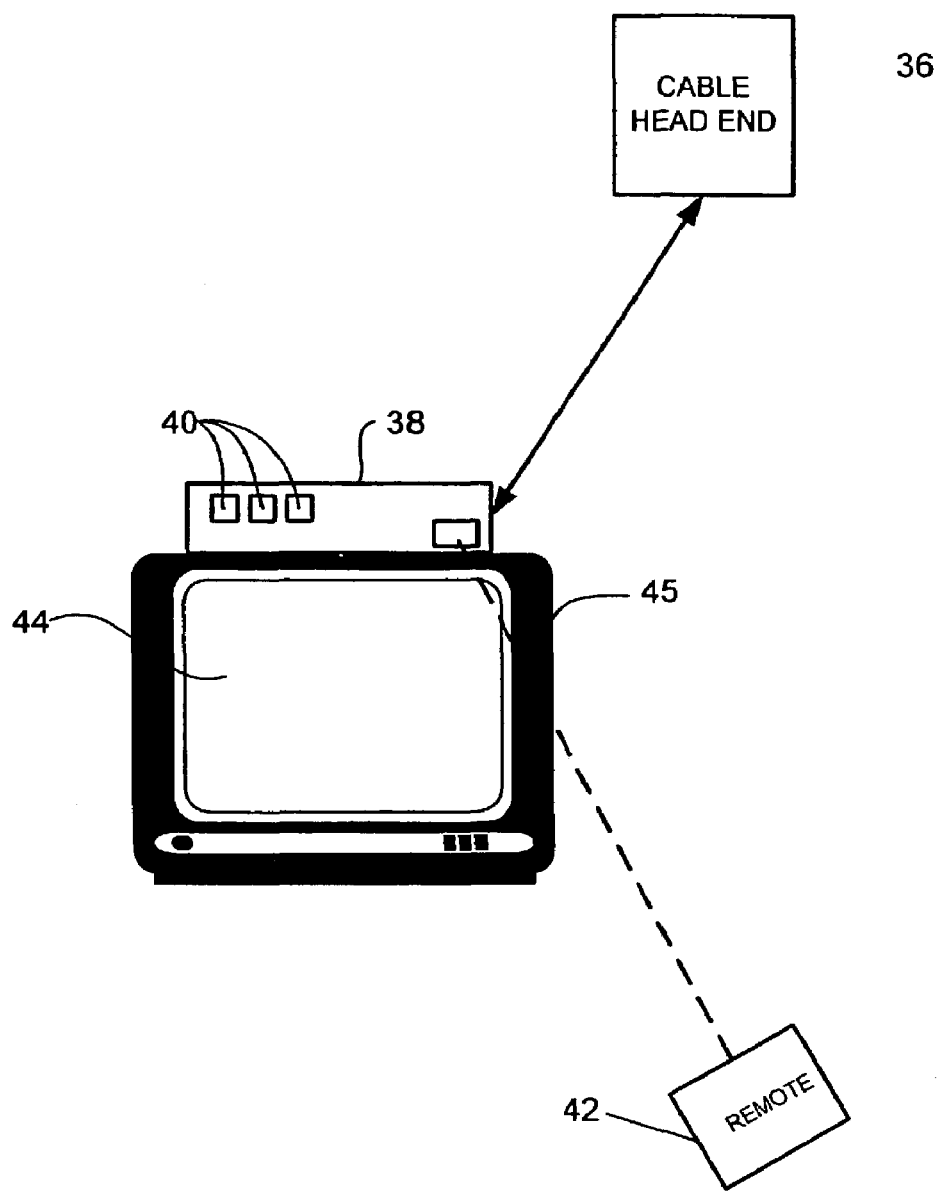
FIG. 4 is a schematic illustrating a set top box connected to a television and in communication with a headend system, and a remote operable to control the set top box.
Figure 8:
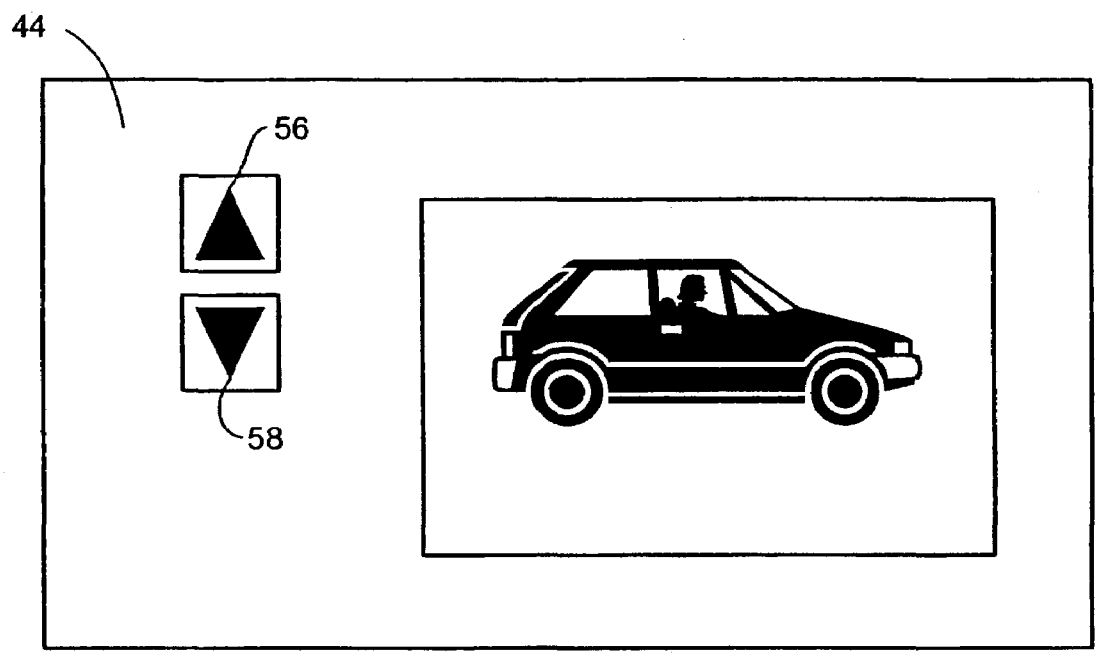
FIG. 8 is an exemplary television screen showing an advertisement and an up/down control icon used to switch between advertisements.

The video signals and program control signals received by the set top box 38 correspond to television programs, advertisements, and menu selections that the viewer may access through a viewer interface (FIG. 4). The viewer interface may be buttons 40 located on the set top box 38 or a portable remote control 42 which operates the set top box or interfaces with control objects displayed on the television screen 44. The remote control 42 may include joy stick type controls operable to move a cursor on the television screen 44 as well as up/down and numeric control buttons. The control objects displayed on the screen may be up/down control icons or a menu containing a list of options. For example, interactive graphics may be displayed as an overlay to an advertisement in a corner of the television screen 44, as shown in FIG. 8. The viewer may move a pointer over an up icon 56 on screen 44 to go to the next advertisement or a down icon 58 to go to the previous advertisement. The graphics may also allow a viewer to point to an object and interact with it (e.g., move it to a different location on the screen). The control objects are preferably generated by the set top box 38 which uses interactive information to execute an application while audio and video information is transmitted to the television 45 (FIG. 4). The set top box 38 may combine audio and video information with interactive graphics prior to transmitting the information to the television 45.

The set top box 38 may be configured for receiving analog signals, digital signals, or both analog and digital signals. If only analog signals are received, the displayed advertisements 24, 26, 28 will be three separate advertisements (e.g., three separate video streams) (FIG. 2). If digital signals are received by the set top box 38, the advertisements 24, 26, 28 may be variants of one another (e.g., same video stream with different graphic overlays), as further described below. The set top box 38 may be configured for use with an interactive digital system which provides a forward path to the user and a return path to the local network gateway. The return path provides a two-way data stream to enable interactivity.

The set top box 38 may be configured, for example, to receive the following input: analog video channels; digital video channels which support broadband communications using Quadrature Amplitude Modulation (QAM); and control channels for two-way signaling and messaging. The digital QAM channels carry compressed and encoded multiprogram MPEG (Motion Picture Experts Group) transport streams. A transport system extracts the desired program or advertisement from the transport stream and separates the audio, video, and data components, which are routed to an audio decoder, video decoder, and RAM, respectively. The set top box 39 further includes a compositor which combines graphics and text with MPEG or analog video.

The broadband analog signal (e.g., 680, 750, 860 MHz) received by the set top box 38 carries multiple channels and is conveyed to a tuner 48 which selects one frequency band out of the available spectrum. In typical cable systems, a 6 MHz piece of spectrum (i.e., channel) is selected out of a range of 50 MHz to possibly 1,000 MHz. The 6 MHz bandwidth may include a program and a number of data streams carrying different advertisements. A demodulator 50 converts the analog signal to a digital signal (e.g., 28 Mb/s) containing a plurality of data streams (e.g., 3 Mb/s data stream). A program ID (PID) selector 52 may be used to select one 3 Mb/s data stream. In order to reduce the 28 Mb/s data stream to a 3 Mb/s data stream, the PID selector 52 looks for packets having a requested program ID, and throws out the rest of the packets. This allows a viewer to switch between different data streams within the 6 MHz bandwidth and display various advertisements for viewing. Thus, viewers watching different television sets may view different advertisements even though the viewers are tuned to the same channel.

Figure 5:
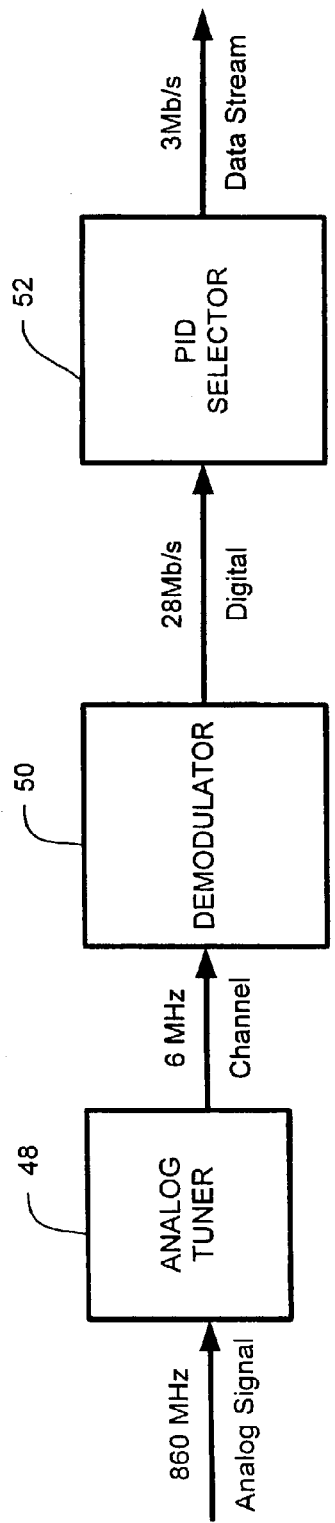
FIG. 5 is a block diagram of a tuner used to select a channel, a demodulator operable to convert the signal into a digital format, and a program ID selector used to select a data stream containing one or more advertisements.

It is to be understood that the system used to select a channel and convert the analog signal to digital may be different than shown in FIG. 5 and that the sample data streams and channel bandwidths may be different than described herein without departing from the scope of the invention.

Figure 7:
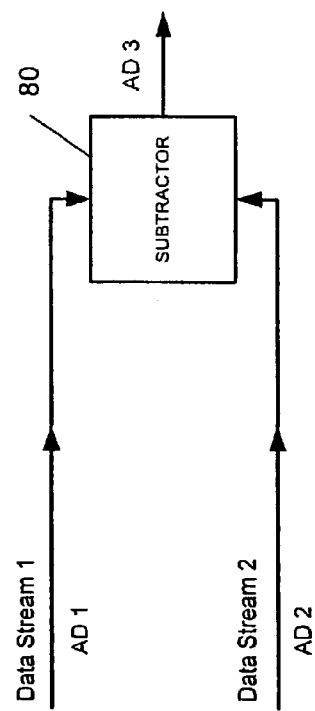
FIG. 7 is a diagram illustrating a subtractor used to create a third advertisement from two different advertisements.
Figure 6:
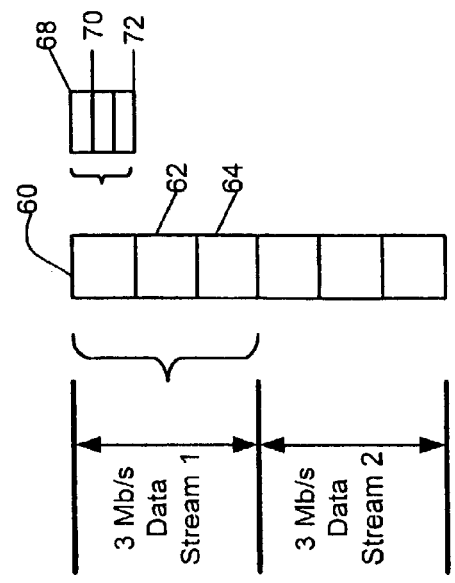
FIG. 6 is a schematic showing a breakdown of one of the data streams of FIG. 5.

As shown in FIG. 6, each data stream may include a plurality of variants 60, 62, 64 and each variant may also include additional subvariants 68, 70, 72. Each 3 Mb/s data stream includes one video stream, thus, the advertisement of Data Stream 1 will have a different video stream than the advertisement provided by Data Stream 2. As shown in FIG. 7, the digital signal from two separate data streams (Data Stream 1, Data Stream 2) may be input to a subtractor 80 to remove certain objects or images from the advertisements to create a third advertisement from two different data streams.

The variants 60, 62, 64, 68, 70, 72 are created by combining the video stream of Data Stream 1 with data from a digital signal. The digital signal may include graphical images which overlay the video stream to create different variations of one advertisement. For example, each advertisement 60, 62, 64 may be directed to the same product, however, each one may be designed to appeal to people's varying tastes and interests. One advertisement 60, for example, may include a sport utility vehicle (SUV) having a bike on the top with a man driving the SUV. Another advertisement 62 may show the SUV driven by a woman with kids and groceries in the back seat. The advertisements 68, 70, 72 may include different colors or types of cars so that a viewer can switch through different advertisements to see which model the viewer prefers.

Variations in the advertisements may be provided by a number of different animation techniques including sprites. A sprite is a two-dimensional image in a small rectangular region of memory that is mixed with the rest of a frame buffer memory at the video level. The sprites may be used in animation by moving or scaling the sprite or sprites on top of a background image. The use of sprites is one technique for performing an animation function using on screen graphic techniques with a television. The object images and background images are separately stored. The different objects (e.g., different color cars) may be combined with a background scene to produce a composite picture. As a result, when the stored images are displayed on a screen, a background portion, which has been hidden by the object, cannot be displayed. For example, one data stream may be provided for the background of a car commercial and sprites may be used to display different color or types of car within the background. Thus, multiple advertisement variants may be created from a single video stream. Techniques such as those disclosed in U.S. Pat. Nos. 5,422,986, 5,767,857, and 5,892,691 may be used in creating a composite picture or video, for example.

A morphing technique may also be used to create variations in the advertisements. Morphing is the transformation of one image into another image using interpolation or distortion. Morphing typically uses two sets of fixed parameters comprising an initial image and a target image. Intermediate images are used to make an object in a first source image metamorphose into a second target image. In each intermediate image, a point corresponding to a point in the source image is positioned by interpolating between a source image point and a point in the target image.

Another technique which may be used to manipulate graphic images to create animation within the advertisements is embedded constraint graphics, such as disclosed in U.S. Pat. No. 5,933,150, which is incorporated herein by reference in its entirety. The constraint-based graphics employs different samples of an image to define the constraints of the system. The samples are grouped into subsets which may be interpolated with one another, according to a user-specified input that determines the relative proportions of each sample image. An animation may be created, for example, by defining a sequence of such interpolated images.

It is to be understood that other techniques may be used to create variants of the advertisement without departing from the scope of the invention.

Each advertisement may include images, audio data, and informational references. The images may be advertisements for products or services and may include still pictures or video images, for example. Audio data may include voice, music or other audio signals for playback in coordination with the images. The images may also be informational images unrelated to advertising. For example, other information services including weather information, stock market services, news services or the like may provide the informational images and audio data.

The advertisements may also include links to other information such as detailed information about the advertised product, purchasing information and the like. For example, if after viewing an advertisement, the viewer wants to obtain additional information about an advertised product, the viewer may select an option listed in a menu which immediately directs the viewer to a new commercial or information piece providing additional information on the product.

Figure 9:
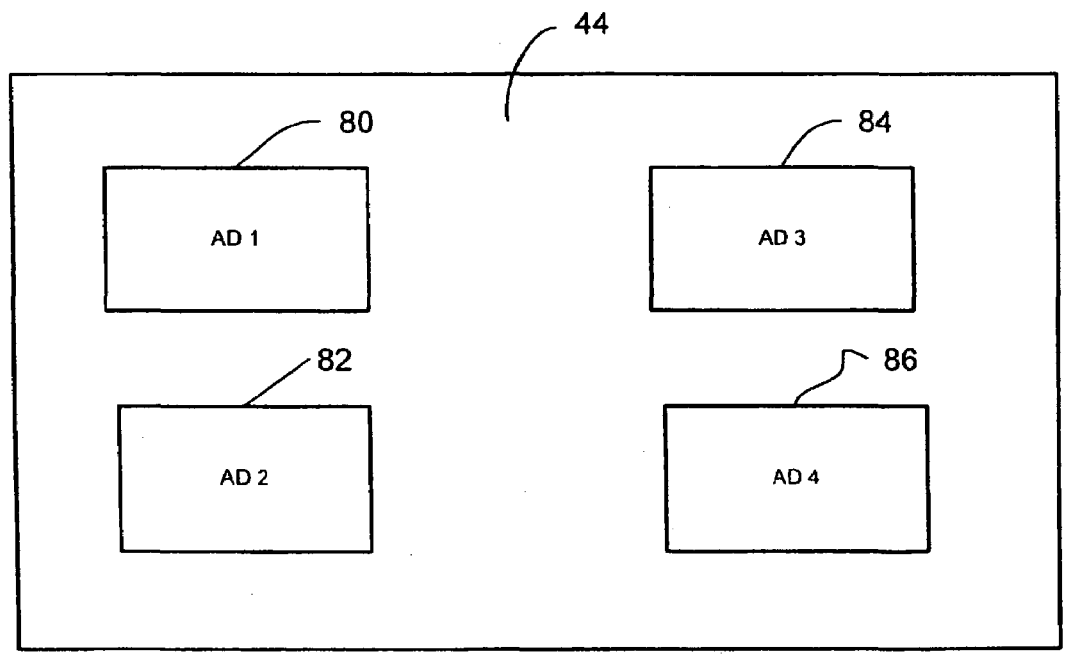
FIG. 9 is another exemplary television screen showing four advertisements displayed at one time for selection by a viewer.

A single advertisement may be displayed for a specified period of time or a series of advertisements may be displayed with a specified display duration for each of the advertisements. If a sequence of advertisements is displayed, a viewer may select a stop (or thumbs up) button when an advertisement is displayed that interests the viewer. As shown in FIG. 9, a plurality of advertisements 80, 82, 84, 86 may also be shown at one time on the television screen 44 for selection by a viewer. The viewer may select one of the advertisements by moving a pointer over the selected advertisement or pressing a corresponding number on a remote control, for example. Multiple advertisements may be sent to the set top box 38 either in real time or ahead of time and stored on disk. The set top box 38 may then select which advertisement to display based on information about the viewers as described below.

The advertisements may also be targeted to viewers based on information about the viewers. For example, an application or program in the set top box 38 may be used to select which advertisement is displayed to a viewer based on a viewer's personal profile. The viewer's personal profile may be created in the set top box 38 and stored in memory. The profile may include demographic and related information gathered by querying a viewer. For example, the viewer may respond to profile screens requesting the user to input information such as birthplace, education level, employment, sex, age, and the like. A personal profile of a viewer may also be created based on viewing history of the user through an information gathering process. The set top box 38 may store information based on times the viewer watches television, programs the viewer has watched, or which variant of specific advertisements the viewer has selected, and use this information to create the viewer's profile. This information may then be used by the set top box 38 in targeting advertisements to the viewer. The personal profile may be set up during initialization of the set top box 38 the first time the viewer uses the box, for example. Once the information is entered, it will be stored in the set top box 38 memory and may be later modified by the viewer, or additional profiles may be added for new viewers. If more than one viewer uses the set top box 38, the viewer will need to identify himself when he turns on the television. This may be accomplished by displaying a menu requesting the viewer to enter his viewer ID, for example. Since this information is stored on the viewer's set top box 38 and not transferred to a remote data collection site, the viewer does not need to be concerned about privacy issues.

Figure 10:
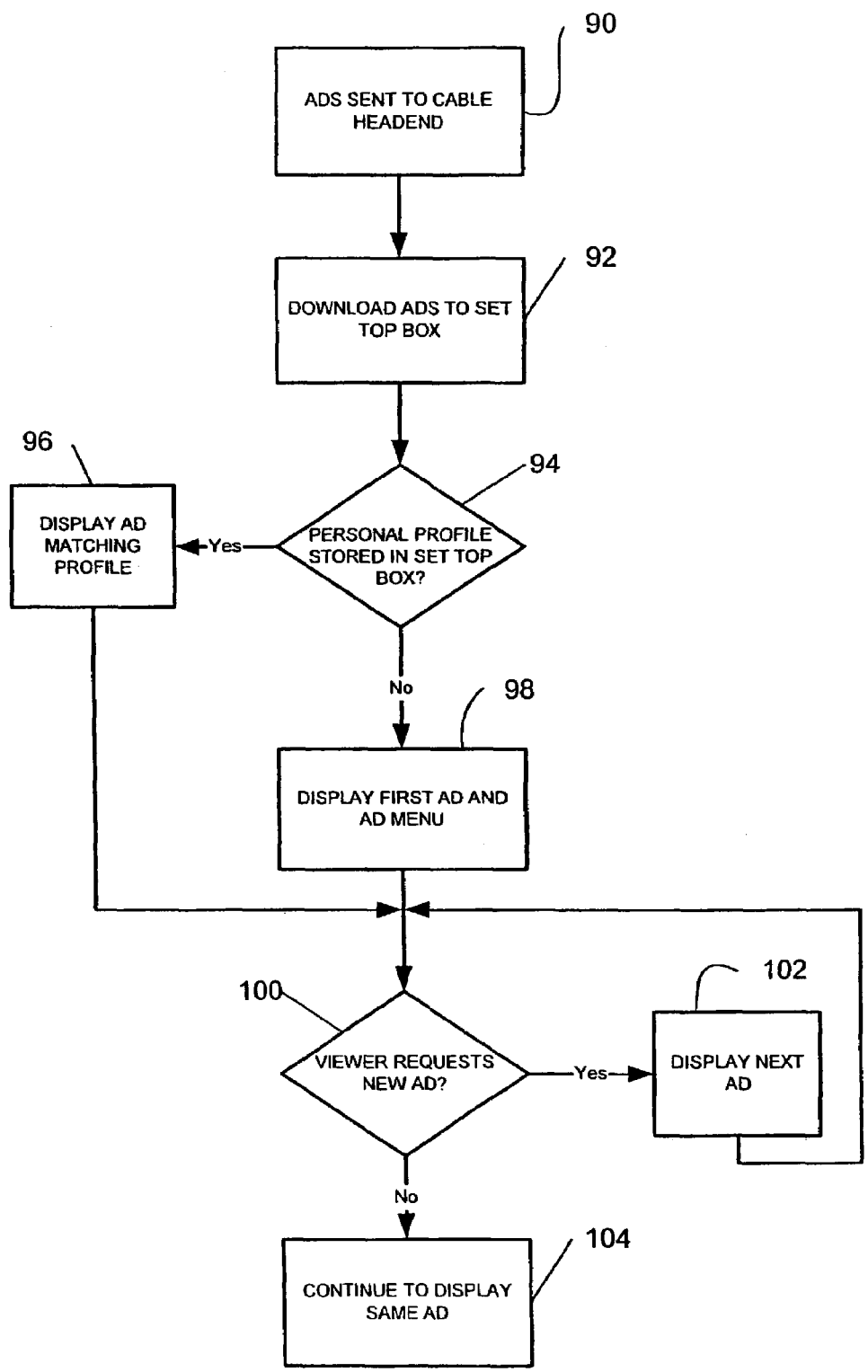
FIG. 10 is a flowchart illustrating a process for displaying an advertisement to a viewer and allowing a viewer to change the advertisement.

FIG. 10 is a flowchart illustrating a process for displaying advertisements and allowing a viewer to switch between the advertisements. The advertisements are first sent to a cable headend system 36 and downloaded to the set top box 38 (steps 90 and 92). If a personal profile has been created, one of the advertisements may be selected to be displayed first to the viewer, based on demographics or other attributes within the viewer's personal profile (steps 94 and 96). If no personal profile is available, a preselected advertisement is first displayed (steps 94 and 98). The viewer may then request the next advertisement to be displayed by pointing to an icon on the television screen or pressing a next ad button on a remote control 42, for example (steps 100 and 102). The viewer may instead choose to continue to view the same advertisement (steps 100 and 104). The viewer may also be presented with a menu that allows the viewer to select between additional variants to the advertisement.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for displaying advertisements comprising:
receiving a data stream comprising a video stream;
deriving from the data stream a first advertisement wherein, the first advertisement comprises a first sequence of video image frames displayed in succession so as to be perceived by a viewer of the first advertisement as a moving picture of a filmed scene, the filmed scene comprising a first object displayed as a first series of component images during the display of said first advertisement, the first series of component images comprising at least part of the first sequence of video image frames and comprising at least two different component images portraying at least in part the first object; and
generating based on the data stream a second advertisement;
wherein the second advertisement comprises a variant of the first advertisement formed by replacing the first series of component images with a second series of component images comprising at least two different component images portraying at least in part a second object, the second object being different from the first object in at least one respect but sharing at least one characteristic of the first object, such that the second advertisement comprises a version of the filmed scene in which the first object has been replaced by the second object but which is substantially the same as the version of the filmed scene portrayed in the first advertisement in all other respects.

2. A method for displaying advertisements as recited in claim 1, further comprising selecting the first advertisement of the second advertisement to display.

3. A method for displaying advertisements as recited in claim 2, wherein the selection is based on a viewer profile.

4. A method for displaying advertisements as recited in claim 1, further comprising:
displaying the first advertisement; and
receiving a command from a viewer to display the second advertisement.

5. A method for displaying advertisements as recited in claim 1, wherein the data stream further comprises an auxiliary digital signal; and generating the second advertisement comprises subtracting an object or an image from the video stream, based on data in the auxiliary digital signal.

6. A method for displaying advertisements as recited in claim 1, wherein the data stream further comprises an auxiliary digital signal; and generating the second advertisement comprises combining the video stream with data in the auxiliary digital signal.

7. A method for displaying advertisements as recited in claim 1, wherein generating the second advertisement comprises overlaying an object or image on the video stream.

8. A method for displaying advertisements as recited in claim 1, wherein generating the second advertisement comprises morphing the first advertisement.

9. A method for displaying advertisements as recited in claim 1, wherein generating the second advertisement comprises modifying the first advertisement.

10. A method for displaying advertisements as recited in claim 1, wherein generating the second advertisement comprises modifying the first advertisement using embedded constraint graphics.

11. A method for displaying advertisements as recited in claim 1, further comprising storing a viewer profile.

12. A system for displaying advertisements comprising:
an input interface configured to receive a data stream comprising a video stream; and
a digital controller coupled to the input interface, configured to derive from the data stream a first advertisement and generate based on the data stream a second advertisement;
wherein:
the first advertisement comprises a first sequence of video image frames displayed in succession so as to be perceived by a viewer of the first advertisement as a moving picture of a filmed scene, the filmed scene comprising a first object displayed as a first series of component images during the display of said first advertisement, the first series of component images comprising at least part of the first sequence of video image frames and comprising at least two different component images portraying at least in part the first object;

and the second advertisement comprises a variant of the first advertisement formed by replacing the first series of component images with a second series of component images comprising at least two different component images portraying at least in part a second object, the second object being different from the first object in at least one respect but sharing at least one characteristic of the first object, such that the second advertisement comprises a version of the filmed scene in which the first object has been replaced by the second object but which is substantially the same as the version of the filmed scene portrayed in the first advertisement in all other respects.

* * * * *